(12) United States Patent
Trantina

(10) Patent No.: US 8,820,264 B2
(45) Date of Patent: Sep. 2, 2014

(54) REMOTELY CONTROLLED FEEDING STATION

(76) Inventor: Scott Trantina, Sioux Falls, SD (US)

( * ) Notice: Subject to any disclaimer, the term of this patent is extended or adjusted under 35 U.S.C. 154(b) by 100 days.

(21) Appl. No.: 13/490,532

(22) Filed: Jun. 7, 2012

(65) Prior Publication Data

US 2013/0327276 A1    Dec. 12, 2013

(51) Int. Cl.
*A01K 5/02* (2006.01)

(52) U.S. Cl.
USPC ........................................ 119/57.92

(58) Field of Classification Search
USPC ............. 119/57.92, 51.01, 52.1, 56.2, 57.2, 119/57.7, 57.1
See application file for complete search history.

(56) References Cited

U.S. PATENT DOCUMENTS

| | | | |
|---|---|---|---|
| 2,797,663 A * | 7/1957 | Bailey | 119/57.6 |
| 3,550,812 A * | 12/1970 | Brown | 222/643 |
| 4,223,638 A * | 9/1980 | Sappington et al. | 119/57.6 |
| 4,313,397 A * | 2/1982 | Markum | 119/703 |
| 4,981,107 A * | 1/1991 | Beaudoin et al. | 119/56.2 |
| 5,309,864 A * | 5/1994 | Harmsen et al. | 119/51.02 |
| 6,532,895 B1 * | 3/2003 | Andersen | 119/57.4 |
| 6,779,486 B2 * | 8/2004 | Vaags | 119/51.11 |

* cited by examiner

*Primary Examiner* — Yvonne Abbott
(74) *Attorney, Agent, or Firm* — Roger Belfay

(57) ABSTRACT

The Remotely Controlled Feeding Station comprises; a support line, a platform suspended from the support line, a propulsion system configured to cause the platform to move along the support line the propulsion system affixed to said platform, and having an optional control system for commanding said propulsion system.

4 Claims, 5 Drawing Sheets

REMOTELY CONTROLLED FEEDING STATION

CROSS REFERENCE TO RELATED APPLICATIONS

There are no applications related to this application.

STATEMENT REGARDING FEDERALLY SPONSORED RESEARCH OR DEVELOPMENT

No invention claimed in this application was made under Federally sponsored research or development.

THE NAMES OF THE PARTIES TO A JOINT RESEARCH AGREEMENT

Not Applicable

REFERENCE TO A SEQUENCE LISTING

Not Applicable

BACKGROUND OF THE INVENTION

1. Field of the Invention

The present invention relates to suspended remote controlled transport systems, including but not limited to systems used for dispensing materials, such materials including but not limited to animal feed.

2. Description of Related Art

Remotely controlled stationary animal feed dispensers are known in the art. US Published Patent Application 20090020074 by Harmon, U.S. Pat. No. 5,868,101 to Marshall, U.S. Pat. No. 5,297,503 to Hibbard, U.S. Pat. No. 5,438,956 to Thigpen, U.S. Pat. No. 5,392,732 to Fry, and U.S. Pat. No. 5,370,080 to Koepp exemplify such stationary remotely controlled feed dispensers.

Mobile animal feed dispensers are also known in the art. U.S. Pat. No. 2,316,463 to Skulina is typical of this class of feed dispenser.

It is the object of the present invention to provide a mobile and remotely controlled material dispenser.

BRIEF SUMMARY OF THE INVENTION

The Remotely Controlled Feeding Station comprises; a support line, a platform suspended from said support line, a propulsion system, said propulsion system configured to cause the platform to move along said support line and said propulsion system affixed to said platform, and an optional control system for commanding said propulsion system. The control system may be of a type which permits an operator to operate the Remotely Controlled Feeding Station from a point remote from the Remotely Controlled Feeding Station.

DETAILED DESCRIPTION OF THE INVENTION

Figure 1:
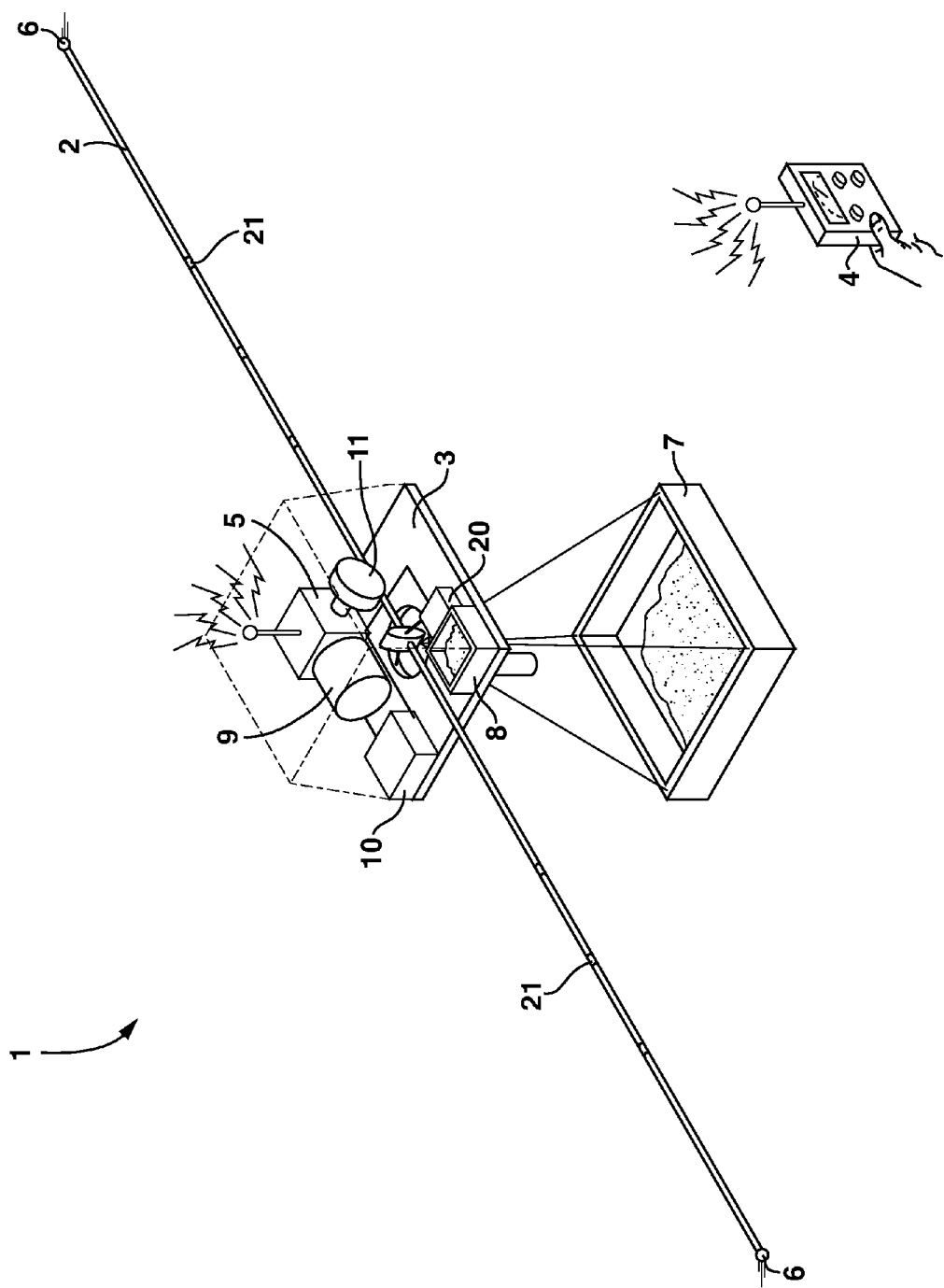
FIG. 1 is a perspective view of the remotely controlled feeding station.
Figure 2:
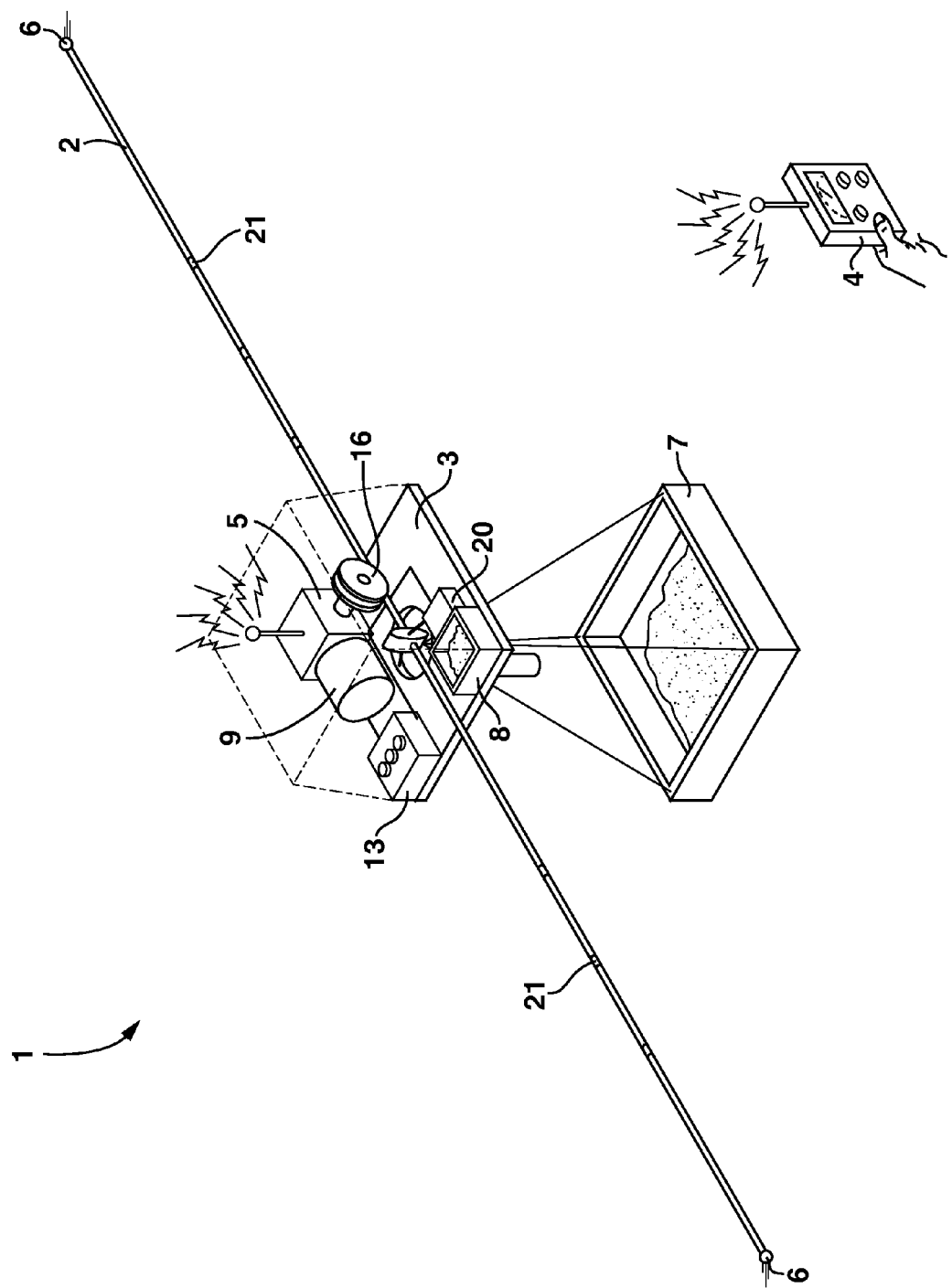
FIG. 2 is a view like FIG. 1 of a second embodiment of the invention.
Figure 3:
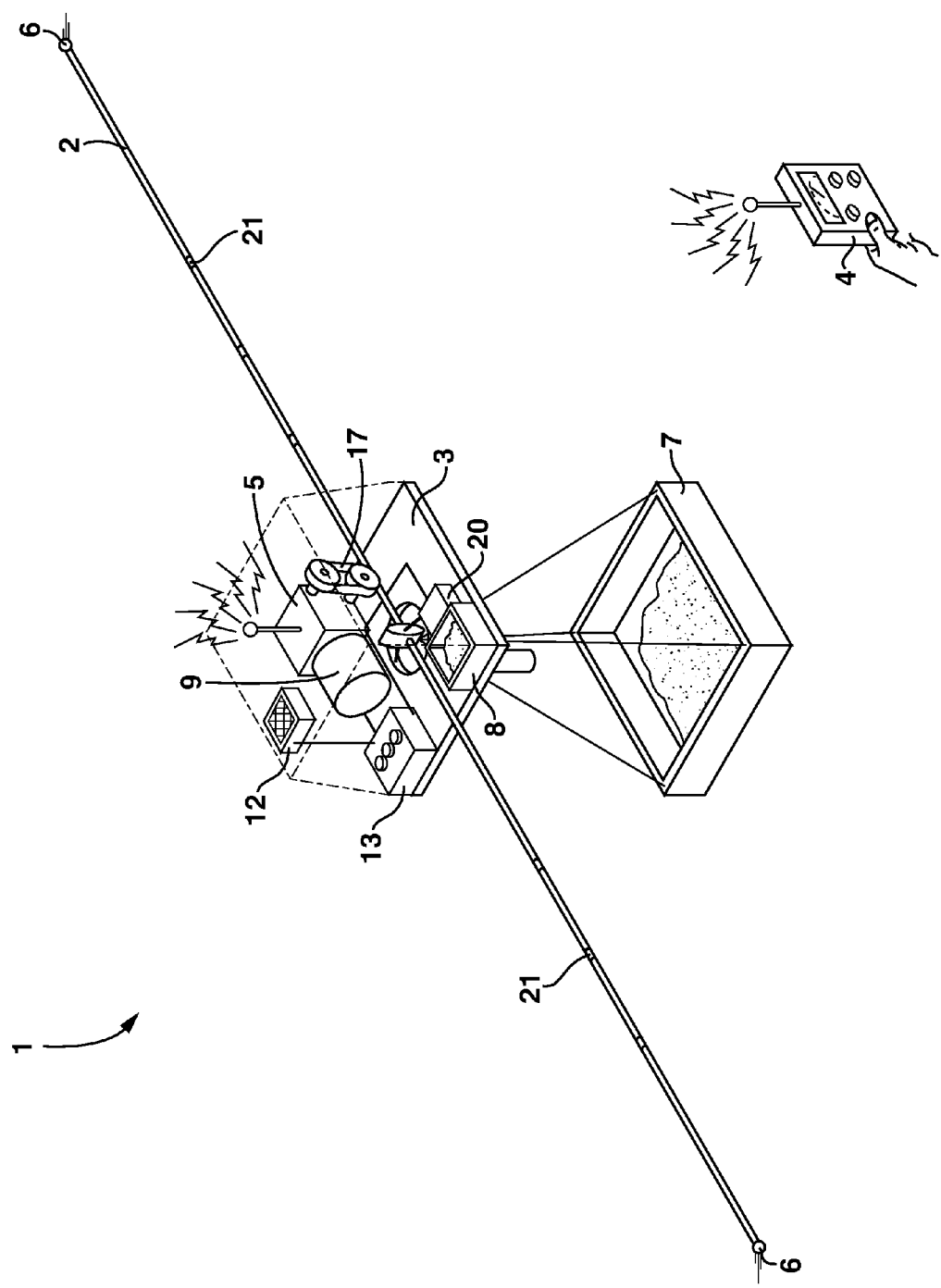
FIG. 3 is a view like FIG. 2 of a third embodiment.
Figure 4:
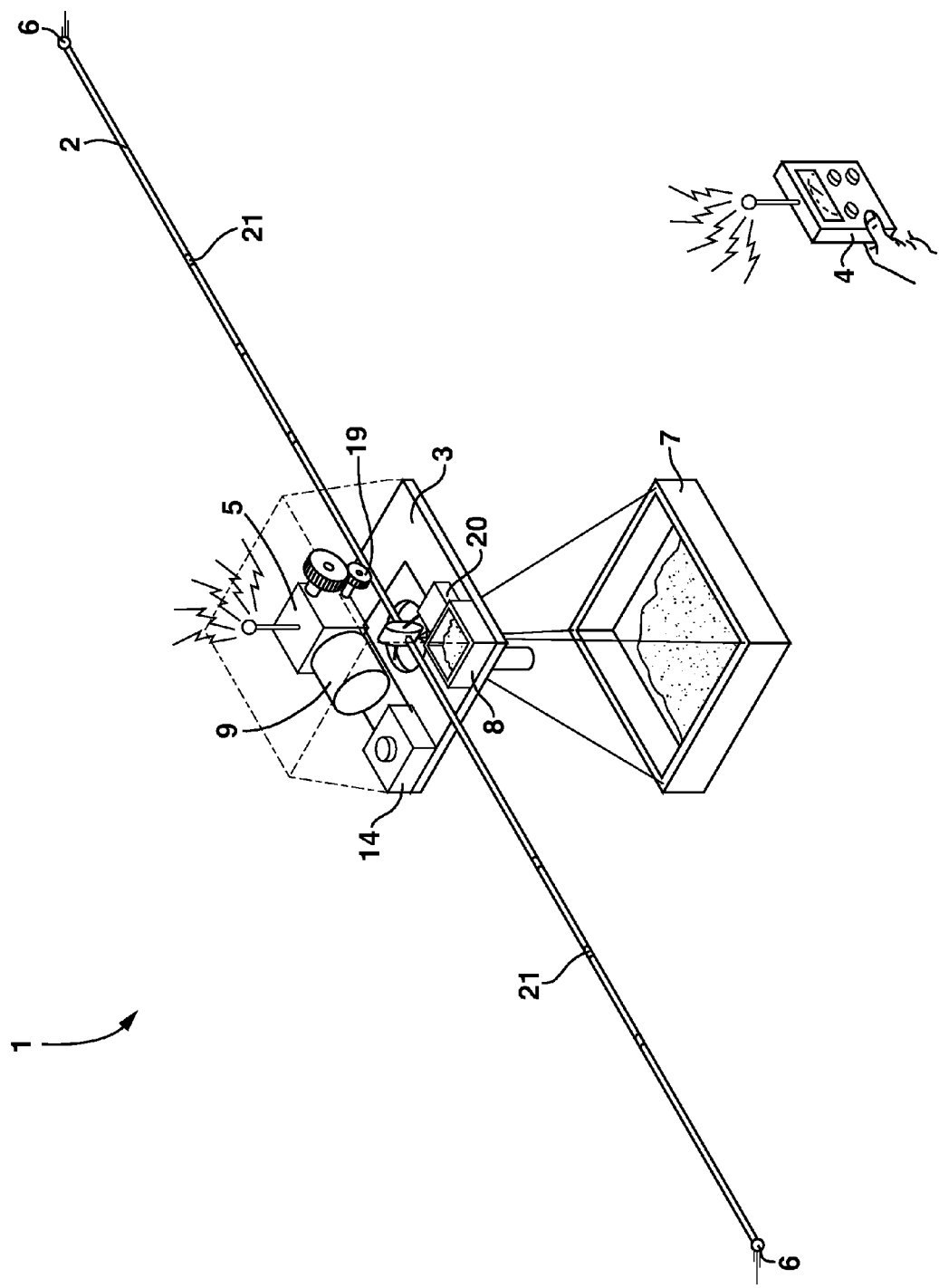
FIG. 4 is a view like FIG. 1 of a fourth embodiment.
Figure 5:
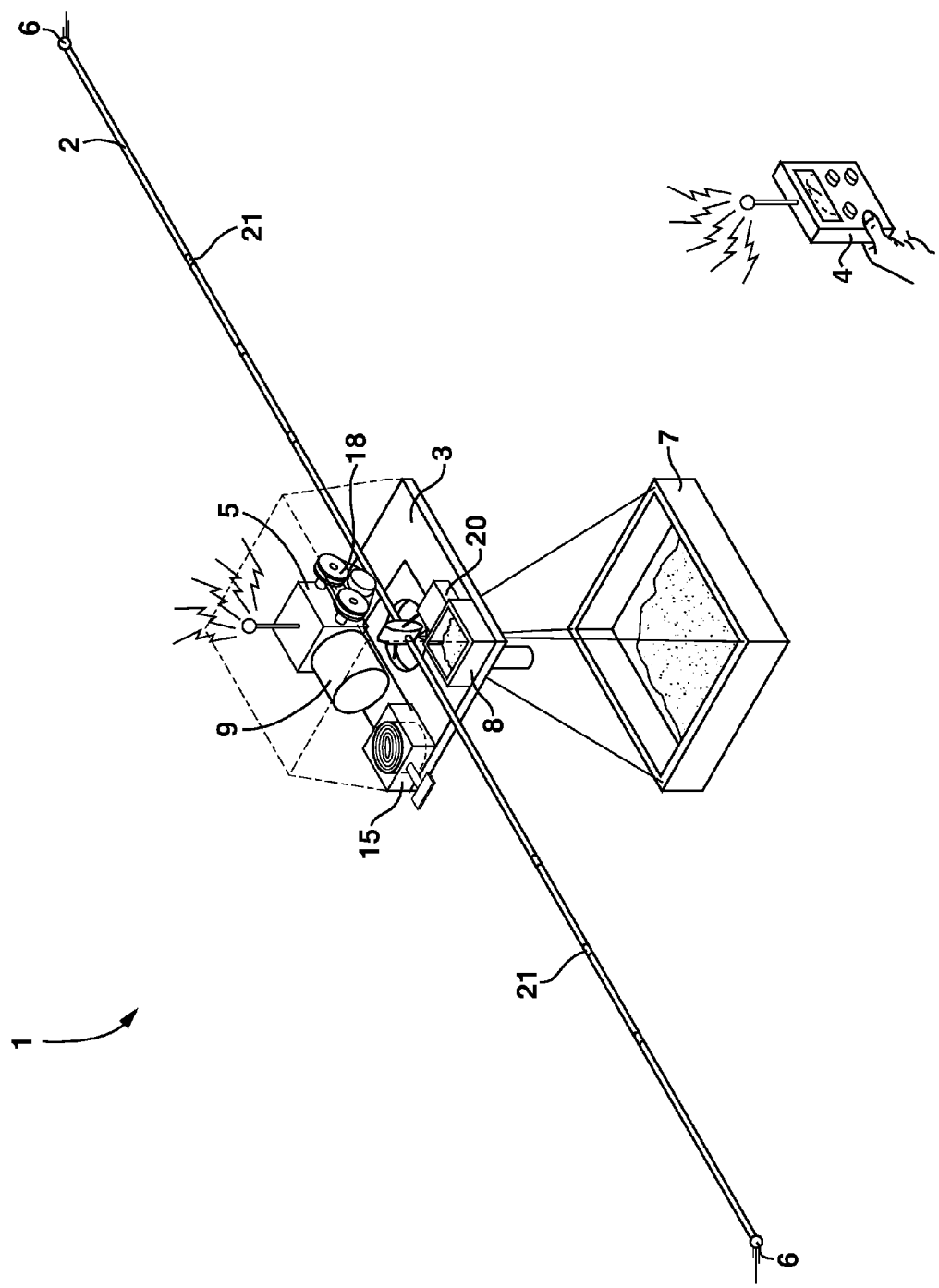
FIG. 5 is a view like FIG. 1 of yet another embodiment.

The Remotely Controlled Feeding Station 1 comprises; a support Line 2, a Platform 3 suspended from said support Line 2, a propulsion system, said propulsion system 5 configured to cause the Platform 3 to move along said support Line 2 with said propulsion system 5 affixed to said Platform 3, and a control system 4 for commanding said propulsion system 5.

The support Line 2 may be of any material capable of flexibly stretching between at least two support points 6 and supporting the weight of the Platform 3 and the components placed on the Platform 3.

The Platform 3 may be of any suitable shape and size required to accommodate a propulsion system 5 and a control system 4 for Remotely Controlled Feeding Station 1. To serve as a Remotely Controlled Feeding Station 1 the Platform 3 must also accommodate a feed trough 7 and optionally a feed dispenser 8. The feed dispenser 8 may or may not be controlled remotely.

The propulsion system 5 comprises a motor 9, an energy storage system 10, a transmission system 11, and optionally a power supply 12. The motor 9 may be an internal combustion engine using a liquid or gaseous fuel such as gasoline, diesel fuel, propane or any fuel suitable to operate an internal combustion engine. The motor 9 may be an alternating current or direct current electric motor. The energy storage system 10 may be an electrical battery 13, or a tank 14 of an appropriate type for storing the liquid or gaseous fuel. In yet another embodiment the energy storage system 10 may be a wound spring 15. In short the motor 9 is any device which converts the energy stored in the energy storage system 10 to mechanical work used to propel the Remotely Controlled Feeding Station 1 along its support Line 2. The transmission is any mechanism which transmits mechanical energy from the motor 9 to the support Line 2 to cause the Remotely Controlled Feeding Station 1 to move along the support Line 2. In one embodiment the transmission system 11 would consist of a wheel 16 resting on the support Line 2, connected by a drive belt 17 to a pulley 18 attached to and turned by the motor 9. In another embodiment the drive belt 17 belt and pulley 18 assembly would be replaced by a gear train 19. It will be recognized that there are a large number of ways by which the motor 9 can be connected to a drive wheel 16, or multiple drive wheels, to cause the Remotely Controlled Feeding Station 1 to move along the support Line 2.

The optional power supply 12 is anything which captures or produces energy and supplies that energy to the energy storage system 10. In one embodiment this optional power supply 12 is a set of photovoltaic cells which supply energy to the electrical battery 13. In another embodiment the optional power supply 12 is an electrical battery charger which can be plugged into a convenient power source placed anywhere along the and sufficiently near the support Line 2. It will be appreciated that this optional power supply 12 may take on many forms and can be envisioned for any of the energy storage systems 10 contemplated. This optional power supply 12 can be as simple as a slot to accommodate a winding key for the spring 15, as complex as photovoltaic cells to charge the electrical batteries, or anything in between.

The control system 4 may be of a preprogrammed type or of a type which can be managed while the Remotely Controlled Feeding Station 1 is remote from the operator. In both cases the control system 4 interacts with the motor 9, transmission system 11 or both to determine the direction and speed at which the motor 9 causes the Remotely Controlled Feeding Station 1 to move along the support Line 2. The preprogrammed type provides a means for the operator to provide control instructions while the Remotely Controlled Feeding Station 1 is close at hand and the control system 4 then executes the instructions provided by the operator. The preprogrammed control system 4 may be as simple as an on-off switch, as complex as a programmable computer, or any level of complexity in-between. The remote control system 4 allows the operator to control the Remotely Controlled Feeding Station 1 via electromagnetic or acoustic waves.

The feed trough 7 is a container which holds food, or drink, for a person or an animal.

The Feed dispenser 8 contains food, or drink, for a person or an animal, which the feed dispenser 8 deposits into a feed trough 7. The time and place of the deposit may be controlled by the control system 4 or by the feed dispenser control system 20.

The feed dispenser control system 20 may be independent of or integrated with the propulsion control system. The feed dispenser control system 20 is controlled remotely, by a position sensing mechanism such as markings 21 on the support Line 2, light sensors, acoustic sensors, or any other means suitable to the particular application.

I claim:

1. a Remotely Controlled Feeding Station comprising:
   a) a support line;
   b) a platform suspended from said support line;
   c) a propulsion system, said propulsion system configured to cause the platform to move along said support line and said propulsion system affixed to said platform; and
   d) a feeding trough suspended from said platform.

2. The Feeding station of claim 1 further comprising a control system for commanding said propulsion system.

3. The Feeding Station of claim 2 wherein said control system permits operation of said propulsion system under control of an operator, said operator being located at a location remote from said feeding platform.

4. The feeding station of claim 2 further comprising one or more devices in addition to said propulsion system, wherein operation of said devices is under control of the control system.

* * * * *